Patented Aug. 10, 1948

2,446,550

UNITED STATES PATENT OFFICE 2,446,550

COTTAGE CHEESE

Gerald C. North and Lawrence Little, Chicago, Ill., assignors to Beatrice Creamery Co., Chicago, Ill.

No Drawing. Application October 4, 1944, Serial No. 557,224

3 Claims. (Cl. 99—116)

This invention relates to cottage cheese and aims to overcome the objectionably chalky, mealy and crumbly texture created in fresh cottage cheese by freezing.

The desirability of freezing cottage cheese during seasons of peak production for use during the season of low production has long been recognized. Although some cottage cheese has been stored in this manner, and in fact is still being stored this way, it is generally accepted that the resulting cheese is inferior to cheese which has not been frozen, especially in texture, in that the frozen cheese when thawed invariably possesses an objectionably chalky, crumbly structure.

We found that a cottage cheese can be produced which when frozen at the time of peak production and subsequently thawed during the season of low production which may be some months later, possesses the characteristic firm body and soft texture simulating fresh cottage cheese. That freezing produces a change in the character of the cottage cheese curd seems to be unavoidable, but in our invention the character of the curd is so regulated that the frozen product, after undergoing the effects of freezing, will, upon thawing, have the desired firm body and soft texture of fresh cottage cheese as distinguished from a mushy, mealy consistency.

We have found that a cottage cheese which is tough and slightly rubbery to the point where it is unpalatable when introduced to freezing and storage will emerge so altered that when thawed it assumes the texture and body of fresh cottage cheese. The tough and rubbery structure is broken down during freezing and storage in such a manner that the characteristic chalky, crumbly body of customary thawed cottage cheese is avoided.

In carrying out the invention for making the cottage cheese curd by our preferred method, we have found it preferable to employ enzymes normally used as coagulators such as rennet although pepsin or mixtures of rennet and pepsin may be used. We are also able to use any convenient setting temperature e. g. 68° F. to 95° F. However, we find that the exact control of acidity is critical and essential in our type of cheese, whereas it is more arbitrary in the conventional methods. We have found it essential to limit the whey acidity at time of cutting to about 0.45% and it may be as low as about 0.35%, i. e., more accurate control of the product is obtained when the curd is cut at a whey acidity between about 0.35 to 0.45%. After the curd is cut, it may be cooked as ordinary cottage cheese curd except that the cooking time and temperature is controlled to obtain the desired toughness and rubberiness of the curd. For example, curd cut when the whey acidity is between about 0.35 to 0.45% will usually attain the desired degree of toughness and rubberiness when cooked to about 110–115° F. for about 45 minutes. In general, lower cooking temperatures for shorter periods are employed with low cutting acidities, and higher temperatures for longer periods with high cutting acidities. However, cutting acidities below 0.25% give too tough a curd particle regardless of the cooking temperature, and curd cut at a whey acidity above 0.45% cannot be toughened sufficiently to withstand freezing and storage.

Instead of controlling acidity, a suitable excess of enzyme coagulator such as rennet may be employed and cooked at a temperature and for a time to produce the tough rubbery body.

Any suitable method which will produce a tough, rubbery, unpalatable curd upon cooking may be used.

When it is desired to cream this cheese before it is frozen, sufficient cream or milk of the desired richness is intimately mixed with the cheese curd and the mixture frozen and stored. The frozen creamed cheese is then ready for immediate consumption without processing when it is withdrawn from storage and thawed.

We claim:

1. The process of making cottage cheese which comprises setting the curd with a coagulating enzyme, cutting the curd when the whey acidity is between 0.25% and 0.45%, cooking the curd to produce a rubbery, tough body, freezing the curd to break down the rubbery tough body, and thawing the frozen curd to thereby produce cottage cheese having a firm body and soft texture and devoid of a chalky, crumbly, mealy nature.

2. The process of making cottage cheese which comprises setting the curd with a coagulating enzyme, cutting the curd when the whey acidity is between 0.25% and 0.45%, cooking the curd at a temperature from about 110° to 115° F. for about 45 minutes, until it has a rubbery, tough body, freezing the curd to break down the rubbery tough body, and thawing the frozen curd to thereby produce cottage cheese having a firm body and soft texture and devoid of a chalky, crumbly, mealy nature.

3. The process of making cottage cheese which comprises setting the curd with a coagulating enzyme, cutting the curd when the whey acidity is between 0.25% and 0.45%, cooking the curd to produce a rubbery, tough body, and freezing the said curd to break down the rubbery, tough body whereby upon thawing a cottage cheese is obtained having a firm body and soft texture and devoid of a chalky, crumbly, mealy nature.

GERALD C. NORTH.
LAWRENCE LITTLE.

REFERENCES CITED

The following references are of record in the file of this patent:

UNITED STATES PATENTS

| Number | Name | Date |
|---|---|---|
| 1,676,138 | Epstein | July 3, 1928 |
| 2,248,289 | Thal | July 8, 1941 |
| 2,251,496 | Parsons | Aug. 5, 1941 |

OTHER REFERENCES

"Fundamentals of Dairy Science," Associates of Rogers, 2d edition. Published by Reinhold Publishing Company, New York, N. Y. Page 255.

"Cheese Making," by J. L. Sammis, 7th edition. Published by The Cheese Maker Book Co., Madison, Wisconsin. Pages 135, 136, 137.